US010819185B2

(12) United States Patent
Kviberg et al.

(10) Patent No.: US 10,819,185 B2
(45) Date of Patent: Oct. 27, 2020

(54) COOLING ARRANGEMENT AND METHOD FOR POWER TOOL

(71) Applicant: ATLAS COPCO INDUSTRIAL TECHNIQUE AB, Stockholm (SE)

(72) Inventors: Erik Markus Peder Kviberg, Nykvarn (SE); Göran Sivert Lantz, Hasselby (SE); Jan Hans Tolly Lewerentz, Hagersten (SE); Hans Niklas Öberg, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 0 days.

(21) Appl. No.: 16/310,442

(22) PCT Filed: Jun. 14, 2017

(86) PCT No.: PCT/EP2017/064550
§ 371 (c)(1),
(2) Date: Dec. 16, 2018

(87) PCT Pub. No.: WO2017/216226
PCT Pub. Date: Dec. 21, 2017

(65) Prior Publication Data
US 2019/0252945 A1 Aug. 15, 2019

(30) Foreign Application Priority Data
Jun. 17, 2016 (SE) ........................................ 1630153

(51) Int. Cl.
H02K 7/14 (2006.01)
H02K 9/20 (2006.01)
(Continued)

(52) U.S. Cl.
CPC ............... *H02K 7/145* (2013.01); *H02K 9/20* (2013.01); *H02K 1/2786* (2013.01); *H02K 9/14* (2013.01)

(58) Field of Classification Search
CPC ............ H02K 7/14; H02K 9/20; H02K 7/145; H02K 1/2786; H02K 9/14
(Continued)

(56) References Cited

U.S. PATENT DOCUMENTS 5,275,538 A * 1/1994 Paliwoda .............. F04D 13/021
123/41.46
2003/0197424 A1 10/2003 Frey et al.
(Continued)

FOREIGN PATENT DOCUMENTS

CN 2149714 Y 12/1993
CN 204179910 U 2/2015
(Continued)

OTHER PUBLICATIONS

International Search Report (ISR), Written Opinion, and International Preliminary Report on Patentability (IPRP) dated Sep. 13, 2017 issued in International Application No. PCT/EP2017/064550.
(Continued)

Primary Examiner — Naishadh N Desai
(74) Attorney, Agent, or Firm — Holtz, Holtz & Volek PC

(57) ABSTRACT

A hand-held power tool includes an electrical motor unit which includes a stator and a rotor arranged concentrically outside the stator, wherein a heat pipe is arranged with a first end inside the stator, thermally connected to the stator, and a second end reaching outside of the stator and thermally connected to a cooling device having a heat sink for cooling the second end of the heat pipe. The heat pipe includes a phase changing fluid for transporting heat from the first end to the second end to be dissipated at the cooling device. A
(Continued)

fan is arranged to provide a cooling air stream to the heat sink and the fan is arranged to provide a cooling air stream to the heat sink independently of an operation of the motor unit.

15 Claims, 4 Drawing Sheets

(51) Int. Cl.
    *H02K 1/27* (2006.01)
    *H02K 9/14* (2006.01)
(58) Field of Classification Search
    USPC .................................................. 310/52–64
    See application file for complete search history.

(56) References Cited

U.S. PATENT DOCUMENTS

| | | | | |
|---|---|---|---|---|
| 2006/0066156 | A1* | 3/2006 | Dong | H02K 9/20 310/54 |
| 2007/0080590 | A1* | 4/2007 | Vinson | F04D 25/082 310/58 |
| 2008/0106159 | A1* | 5/2008 | Yoshida | H02K 9/22 310/50 |
| 2009/0295236 | A1* | 12/2009 | Bott | H02K 7/08 310/12.14 |
| 2010/0026109 | A1* | 2/2010 | Hassett | H02K 9/20 310/54 |
| 2010/0123359 | A1* | 5/2010 | Nishikawa | B25B 21/00 310/50 |
| 2011/0001368 | A1* | 1/2011 | Lau | B25F 5/008 310/50 |
| 2011/0006621 | A1* | 1/2011 | Lau | B25F 5/008 310/50 |
| 2011/0180286 | A1* | 7/2011 | Oomori | B25F 5/008 173/20 |
| 2011/0227431 | A1* | 9/2011 | Af Ursin | F28D 15/0275 310/54 |
| 2012/0313464 | A1 | 12/2012 | Fukuoka et al. | |
| 2014/0368064 | A1* | 12/2014 | Fedoseyev | H02K 9/20 310/54 |

FOREIGN PATENT DOCUMENTS

| | | |
|---|---|---|
| DE | 4230379 A1 | 3/1994 |
| EP | 2754535 A2 | 7/2014 |
| JP | 59072960 A | 4/1984 |
| JP | H0666268 U | 9/1994 |

OTHER PUBLICATIONS

Chinese Office Action dated Jan. 17, 2020 issued in Chinese Application No. 201780037264.6.

* cited by examiner

COOLING ARRANGEMENT AND METHOD FOR POWER TOOL

FIELD OF THE INVENTION

The present invention relates to an electric power tool with a cooling arrangement for cooling the electric motor of the tool.

RELATED ART AND BACKGROUND OF THE INVENTION

In power tools including an electrical motor unit, for example fastener tools, such as a discontinuous drive tool or an impulse tool, thermal energy, i.e. heat, is produced in the electrical motor unit. FIG. 1 schematically shows an example of such a power tool 100. The power tool 100 includes a body/housing 101 and an output shaft 102. An electrical motor unit is used for driving the output shaft 102. The output shaft 102 is arranged to rotate around a rotation axis. The electrical motor is often driven by a battery 104, but can also be driven by other power supplies, such as cables providing power. The battery can be mounted on a handle 103 of the power tool, as shown in FIG. 1, but can also be mounted on other parts of the power tool 100. Within the housing 101 of the power tool 100 an electrical motor and a gearing equipment are arranged.

A conventional electrical motor unit includes a stator arranged in a fixed relation to the housing 101 of the tool 100 and a rotor arranged to rotate with respect to the stator, around a rotation axis which is preferably common to the rotation axis of the output shaft 102. The rotor is caused to rotate with respect to the stator by magnetic fields induced between the stator and the rotor. The magnetic fields can be induced by electrical currents running in windings arranged on the stator and/or rotor. In an often used configuration of the electrical motor, the stator includes the windings, and the rotor is a permanent magnet.

When the electrical motor unit is activated for rotating the rotor, thermal energy in the form of heat is created in the electrical motor unit. Power tools often need large currents, resulting in high powers, under a short time period for driving the shaft 102 of the tool to rotate, i.e. for driving the rotor to rotate, and for providing an adequate torque. For example, a discontinuous drive tool can for example consume 1000 W under a limited time period, e.g. when fastening a nut or the like.

The parts of the electrical motor unit, i.e. the stator, the rotor and the windings, are sensitive to overheating. Overheating may shorten the useful life of the motor parts. A stator can typically be considered as overheated at temperatures exceeding approximately 80° C.-140° C., depending on material and configuration of the stator. If the stator is exposed to such temperatures repeatedly, its performance will be decreased and its useful life time will be dramatically shortened. Therefore, the tool must rest and cool off after and/or in between use, or the electrical motor unit should be actively and continuously cooled in order to prevent overheating. In general, a high productivity is desired and required for the tool, such that a high number of sequential activations, e.g. tightening or loosening operations may be performed. Therefore, cooling of the electrical motor is needed.

In the prior art solutions the cooling effect provided is often not sufficient. As an example one or more fans have been used for providing air flows though the electrical motor unit. Such fans may typically be arranged to blow and/or suck air to pass by the stator, rotor and/or the windings to lead away thermal energy from the electrical motor unit. However, these prior art solutions offer a poor cooling effect, which may not prevent overheating over time and hence leads to a lowered productivity of the tool.

Especially, for encapsulated electrical motor units and for electrical motor units having the stator located inside the rotor, the prior art solutions result in very poor cooling performance, since the use of the air flow is inefficient for leading away thermal energy for such motor units. Therefore, an unacceptably low productivity for the tools is achieved. Encapsulated motor units are common for tools being used in dirty environments.

An example of an air cooled hand tool is disclosed in EP 2754535 A2 wherein a separate fan is arranged to cool the motor independently of the operation of said motor. Even though a fan is used the cooling effect will not be sufficient over time to cool a hand tool during continuous operation.

Another arrangement is known from DE 4230379 in which a heat pipe is arranged inside the rotor of an electric motor of power tool. Further, a fan is arranged on the rotor so as to both cool the heat pipe and provide air cooling to the windings of the rotor. The heat pipe provides for an efficient cooling, but the arrangement of DE 4230379 is adapted to a specific embodiment having the rotor arranged coaxially inside a tube shaped stator. For instance, the electric winding are arranged on the rotor and a slip ring is arranged to provide electric power to the rotor.

For most power tools, such as discontinuous drive tools or impulse tools, it is advantageous to arrange the stator coaxially inside the rotor. This is due to the fact that an outside located rotor can provide a high torque already at a low rotational speed. Consequently, the torque will be sufficient for most applications and the need for gearing will hence be reduced or eliminated for such tools with a centrally arranged stator. If the stator is located coaxially outside the rotor, a lower torque and a higher rotational speed will typically be provided by the motor, which calls for a gearing to gear down the rotation of the motor so as to achieve enough torque.

When providing a cooling air flow through the electrical motor unit, there is a risk that dirt is introduced into the electrical motor unit, since small dirt particles may be carried by the air flow into the electrical motor. The air gap between the rotor and the stator need to be very narrow in order to achieve an efficient motor. Dirt particles that are accidentally blown or sucked into the motor may therefore get stuck in this narrow air gap, which could prevent the rotor from rotating. Thus, the electrical motor unit could break due to such dirt that is blown into it by the prior art cooling solutions.

Hence, there is a need for a cooling arrangement that efficiently cools an electric motor with a stator arranged coaxially inside a rotor.

SHORT DESCRIPTION OF THE INVENTION

It is an object of the present invention to provide a robust power tool that solves the problems of cooling in conventional hand tools and that provides an efficient cooling of an electric motor comprising a stator that is arranged coaxially inside a rotor.

This object is achieved in accordance with a first aspect of the invention which corresponds to a power tool, an electrical motor unit comprised of stator and a rotor arranged concentrically outside the stator. A heat pipe is arranged with a first end inside the stator thermally connected to said stator, and a second end reaching outside of the stator and being thermally connected to a cooling device comprising a heat sink for cooling the second end of the heat pipe, the heat pipe comprising a phase changing fluid for transporting heat from the first end to the second end to be dissipated at the cooling device.

By utilization of a heat pipe for transporting the heat away from the electrical motor, a lightweight and compact power tool is provided by the present invention.

The present invention provides an efficient cooling for the electrical motor unit. Due to the efficient cooling of the electrical motor unit, the productivity of the power tool is considerably increased, since the power tool can be actively used, e.g. for tightening fasteners, for longer time periods than has been possible for prior art power tools.

Also, a robust power tool is provided by the present invention, since the risk of motor failure due to dirt being trapped in the motor is reduced. When the cooling arrangement according to the present invention is implemented in a power tool, the heat is lead away from the electrical motor unit before being dissipated. There is thus no need for blowing air through the electrical motor unit, which reduces the risk of blowing dirt particles into the rotor and/or stator parts of the electrical motor unit.

In a specific embodiment the electrical motor unit is encapsulated so as to prevent air from entering the motor unit. With such an embodiment it is made sure that air that otherwise could incur dust and dirt into the motor unit is prevented from entering into the space of the motor unit. The encapsulation provided may be of different degrees. As a first measure it should prevent air, dust and dirt to enter the motor unit. In another degree of encapsulation the power tool should withstand exposure to pressurised air, which is advantageous as it allows the power tool, and specifically the cooling device to be cleaned by means of pressurized air. In yet another degree of encapsulation the power tool should withstand to be submerged into a liquid, such as water without risking that liquid enters into the motor unit.

In a specific embodiment the cooling device is arranged outside the air tight encapsulation covering the motor unit. Further, a removable housing part may be arranged to cover the cooling device: It may also be arranged to cover a fan. The housing part is preferably easily removable so as to allow cleaning of the cooling device and, if a fan is arranged it may also be accessible to allow cleaning of it.

The heat sink preferably includes at least one cooling fin arranged for dissipating thermal energy and a fan is preferably arranged to provide a cooling air stream to said heat sink.

The fan may be arranged to provide a cooling air stream to said heat sink independently of the operation of the motor unit. Specifically a battery may be specifically allocated to drive the fan.

Further a sensor may be arranged to monitor the temperature of the motor unit and the fan may be arranged to provide a cooling air stream to the heat sink based on said monitored temperature of the motor unit.

The heat sink may also be an external part of a housing of the tool, said part being exposed to an ambient temperature, and the cooling device may also be arranged partly inside a housing of said tool and partly outside said housing.

Since the heat is transported away from the electrical motor unit, the present invention is especially applicable when the power tool is provided with an encapsulated motor unit and when the motor unit has its stator arranged inside its rotor. Encapsulated motor units and motor units having an interior stator have traditionally been particularly difficult to cool down since the contact with ambient air for the stator is restricted.

To transport the heat away from the motor unit also has an advantage in that the heat dissipation can be done in a position at the power tool which is suitable for this purpose.

Detailed exemplary embodiments and advantages of the power tool, the cooling arrangement and the cooling method according to the invention will now be described with reference to the appended drawings illustrating some preferred embodiments.

DETAILED DESCRIPTION OF PREFERRED EMBODIMENTS

Figure 1:
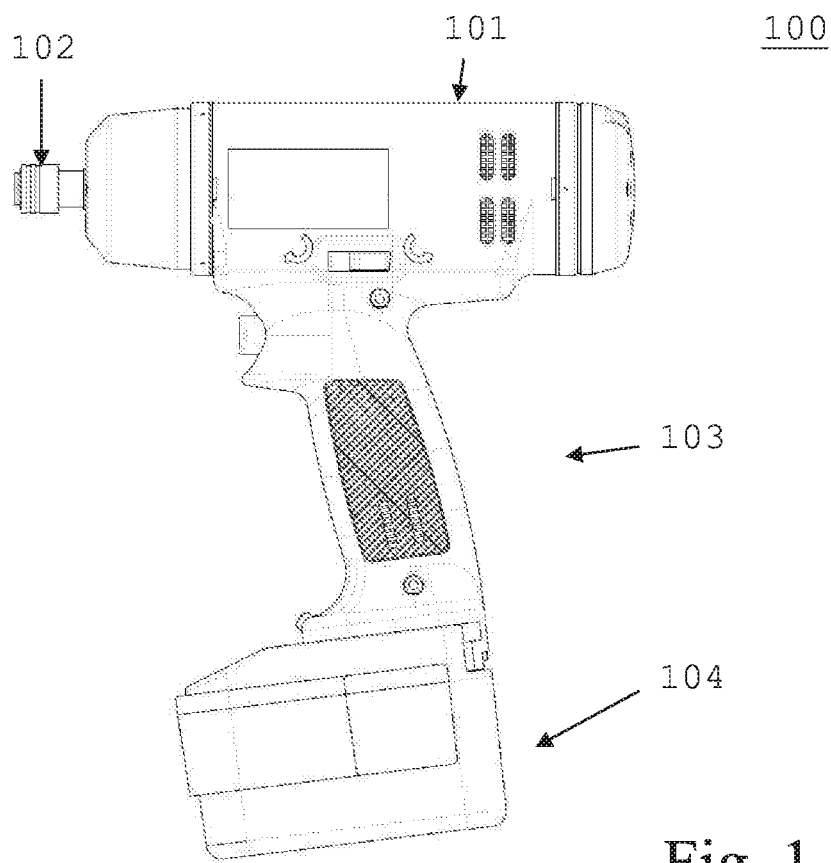
FIG. 1 shows a power tool of the prior art.
Figure 2:
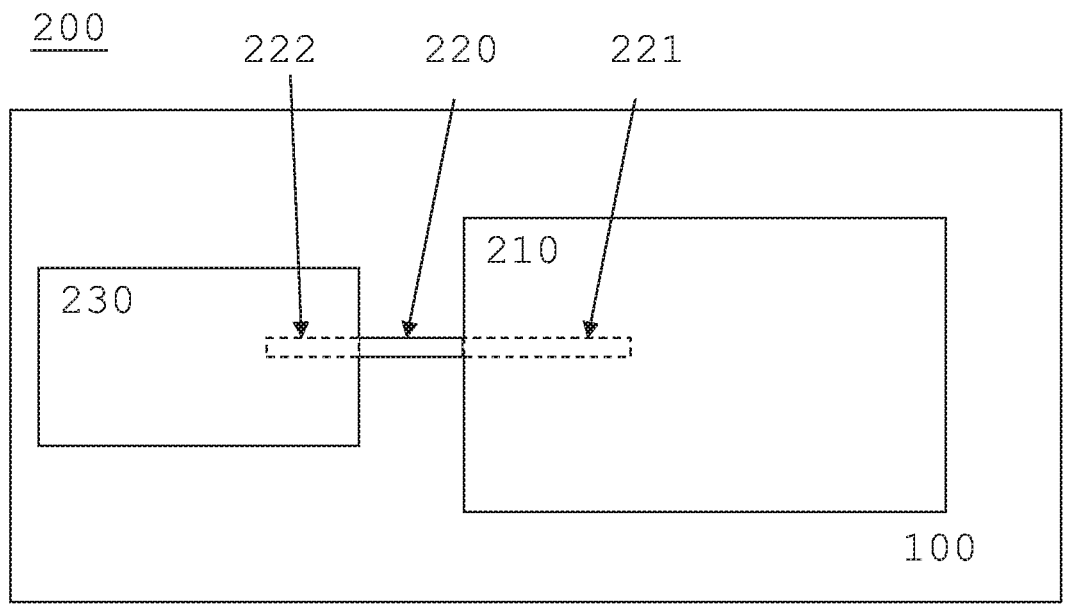
FIG. 2 is a very schematic presentation of a motor unit with a cooling arrangement in accordance with the present invention.

FIG. 2 is a very schematic presentation of a motor unit 210 with a cooling arrangement in accordance with the present invention. FIG. 2 is intended to illustrate the general cooling procedure of the invention.

The energy transporting device 220 combines the principles of both thermal conductivity and phase transitions for efficient transport of energy, such as heat, between one warm and one cold interface, where the warm interface is the first end 221, being in contact with the electrical motor unit 210, and the cold interface is the second end 222, which is in contact with the cooling device 230. Typically, energy transporting device 220 is a heat pipe. As such, the energy transporting device 220 utilizes transitions between liquid and vapour phases of a working fluid within the energy transporting device 220 for transporting thermal energy from the first end 221 to the second end 222 of the energy transporting device.

At the warm interface of the energy transporting device 220, i.e. at the first end 221, the working fluid is vaporized from liquid to vapour by absorbing heat from the electric motor unit 210, which is thereby cooled. The vaporized working fluid then condenses back into a liquid at the cold interface at the second end 222, releasing the latent heat to the ambient environment. The liquid working fluid then returns to the warm interface at the first end 221 through capillary and/or gravity action, where it evaporates over again producing a cycle that will continue as long as the temperature difference between the first and second is over a certain threshold $\Delta T$, and/or the temperature at the first end 221 is over a specific temperature causing the liquid to evaporate. The internal pressure of the energy transporting device 220 can be adapted to facilitate the phase change such that the function and energy transport of the energy transporting device can be adapted to meet the demands of the specific electrical motor unit 210, i.e. by controlling the evaporation temperature to a desired temperature corresponding to a temperature well below a set maximum temperature of the motor unit 210.

According to a preferred embodiment of the invention, the energy transporting device 220 is a heat pipe. The working fluid within the energy transporting device 220 may e.g. be one or more of water, ammonia, methanol, ethanol, acetone, flutec PP2, flutec PP9, toluene, pentane, and heptane. Other suitable working fluids may also be used, which is obvious to person skilled in the art. In a specific embodiment the water is used and a negative pressure is provided inside the energy transporting device 220 so as to lower the boiling point of the water and hence to lower the effective temperature of the energy transporting device 220. By means of such an energy transporting device 220 the temperature of the stator may be kept at approximately 45-65° C. during operation, which is approximately 20° C. lower than what may be achieved by means of conventional air cooling.

The cooling device 230 is thus arranged separate from the electrical motor unit 210 and is in thermal contact with the energy transporting device 220, more precisely in thermal contact with the second end 222 of the energy transporting device 220. Hereby, the heat created within the electrical motor unit 210 is efficiently transported away from the electrical motor unit 210 to the cooling device 230, where the heat is dissipated.

Figure 3:
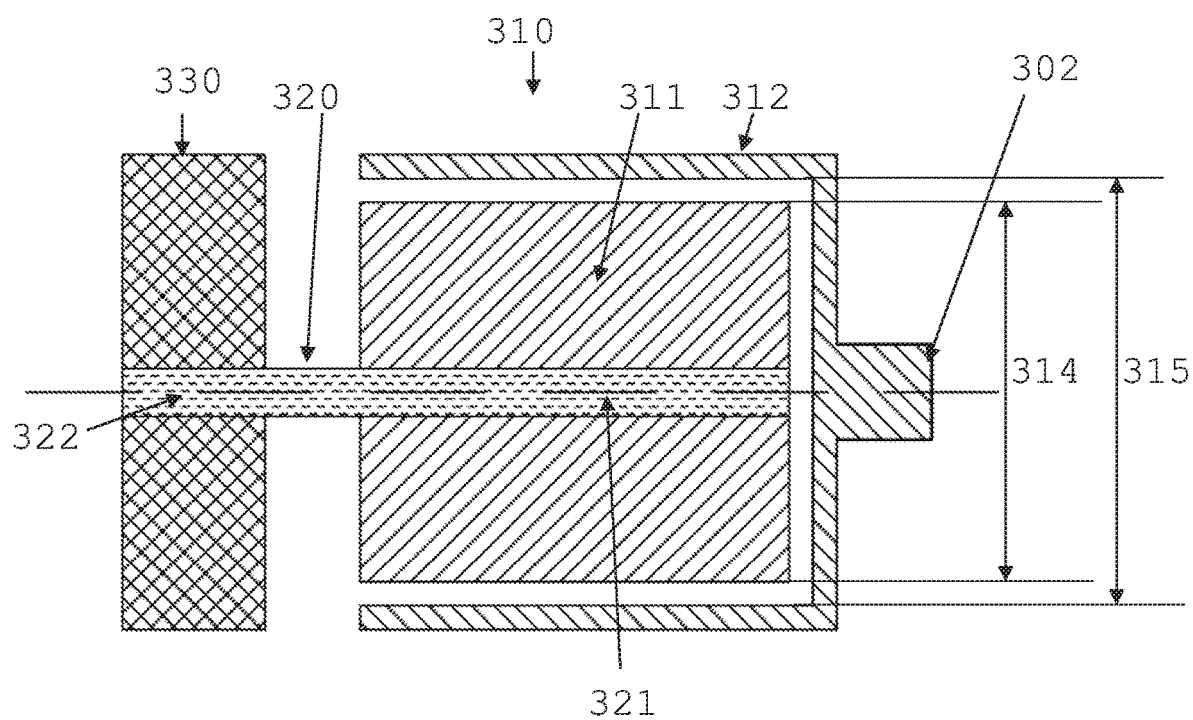
FIG. 3 shows a motor unit in accordance with a first embodiment of the invention.

FIG. 3 schematically discloses an embodiments of the present invention. The cooling arrangement is utilized for cooling an electrical motor 310 having a rotor 312 arranged outside the stator 311 and connected to the spindle/shaft of the power tool via a shaft connector 302, which may be integral with output shaft or connected thereto. Thus the stator 311 is located inside the rotor. Specifically, the stator 311 and the rotor 312 are arranged concentrically with respect to each other, where the stator has an outer stator diameter $D_{stator\_outer}$ 314 that is smaller than an inner rotor diameter $D_{rotor\_inner}$ 315, i.e. $D_{stator\_outer} < D_{rotor\_inner}$ as is apparent from FIG. 3. The first end 321 of the energy transporting device 320 is in thermal contact with the stator 311, such that heat from the stator 311, e.g. from the stator windings, can be transported away from the electrical motor unit 310 and to the cooling device 330 due to the thermal contact between the second end 322 of the energy transporting device 320 and the cooling device 330.

According to an embodiment of the invention, the first end 321 of the energy transporting device 320 is integrated with the stator 311. The rotor 312 of the embodiment shown in FIG. 3 is preferably mounted in bearings arranged around the shaft connector 302. The stator is fixed to the housing in a not shown manner.

Figure 4:
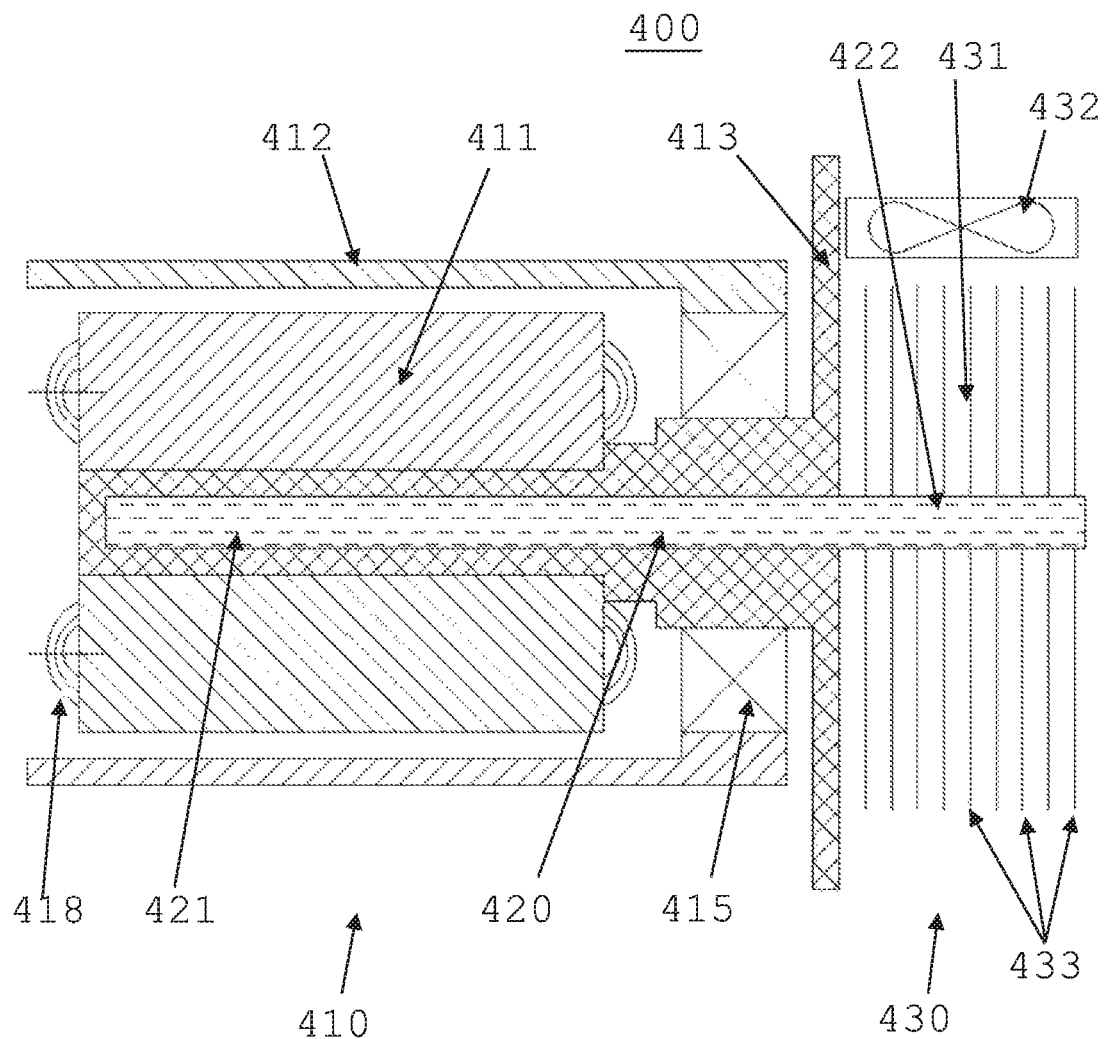
FIG. 4 shows a motor unit in accordance with a second embodiment of the invention.

FIG. 4 schematically shows a cooling arrangement 400 for the electrical motor unit 410, including the energy transporting device 420 and the cooling device 430. Here, the rotor 412 is arranged concentrically outside the stator 411 and the stator windings 418 are thus arranged inside the rotor 412, thereby creating heat that need to be managed such that the stator 411 is not overheated. The stator 411 is here carried by a stator bracket 413 connected to the tool housing and the rotor 412 is rotatably arranged in bearings 415, typically a ball bearing, on the stator bracket 413. The bearing 415 may be arranged in any other ways providing a stable support for the rotor 412, such that a controlled and low frictional rotation can be achieved for the rotor 412. For instance it may be arranged at the front end of the rotor as described with respect to the embodiment shown in FIG. 3.

The first end 421 of the energy transporting device 420 is arranged in thermal contact with the stator 411 inside the motor unit 410, here by thermal contact with the stator 411 and the stator windings 418 via the stator bracket 413. The second end 422 of the energy transporting device extends out from the electrical motor unit 410 and into the cooling device 430. The second end 422 is in thermal contact with the cooling device 430, which according to this embodiment is exemplified by a heat sink 431. The heat sink 431 can include one or more cooling fins, where the cooling fins dissipate the heat into the ambient cooling media, which often is air.

The heat sink 431 can be designed to have a large area, e.g. including cooling fins, in contact with the cooling media surrounding the heat sink. The heat dissipation achieved by the heat sink and/or cooling fins could usually only be made enough to cool the electrical motor unit 410 if the power tool is very large in size. However, there is a demand for compact power tools. Therefore, to provide even higher heat dissipation and thus even more efficient cooling of the electrical motor unit 410, a fan 432 is included in the cooling device 430. The fan 432 provides a stream of cooling air through and/or onto the heat sink 431 in order to increase the heat exchange between the heat sink and the ambient air, and thereby increasing the cooling performance of the cooling device 430. Thereby, the size of the power tool can be reduced, since the heat sink with cooling fins can be made smaller due to the more efficient cooling.

Figure 5:
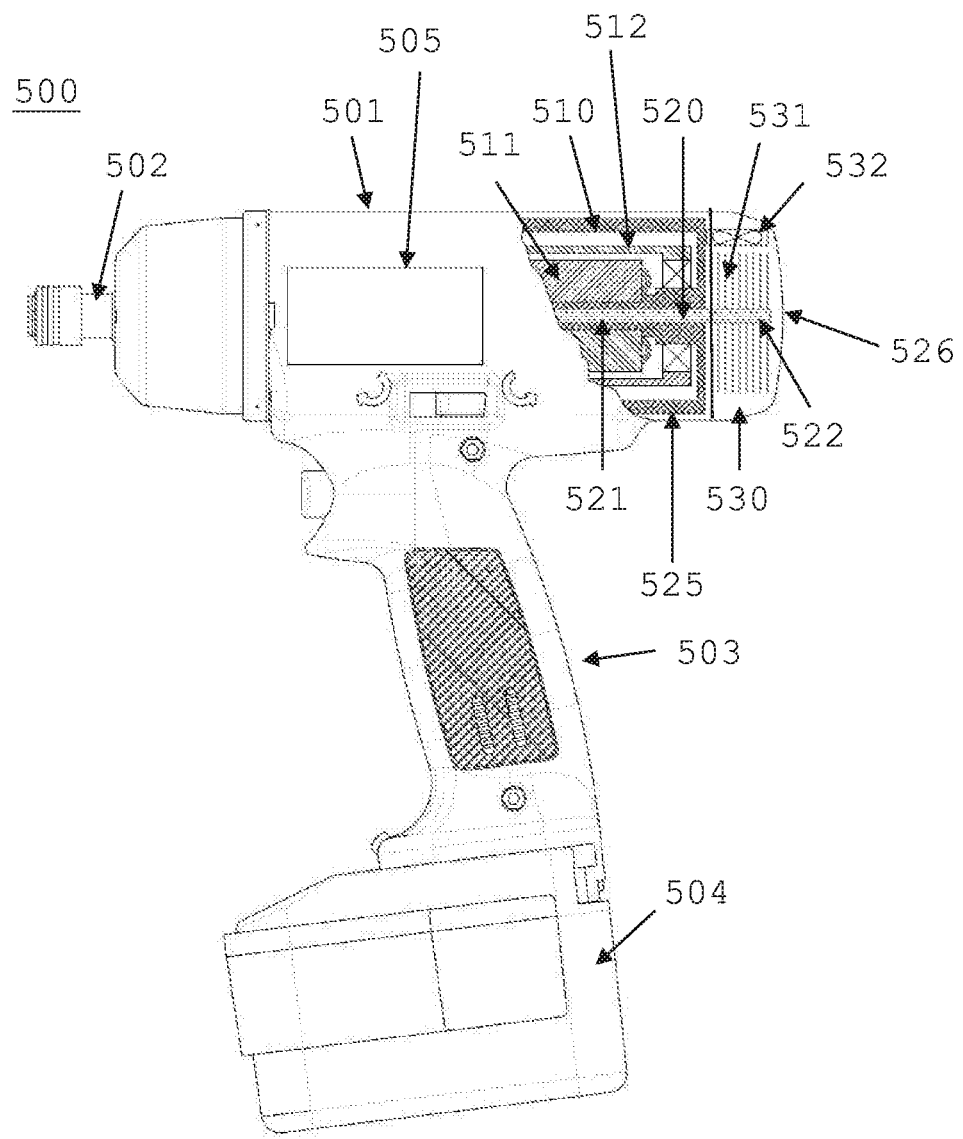
FIG. 5 shows a power tool including a motor unit of the second embodiment.

In FIG. 5, a motor unit 410 as shown in FIG. 4 is shown arranged in a power tool 500. The power tool is shown with part of the housing removed for illustrative purposes. The power tool 500 has a shaft 502, a housing 501, a handle 503, and a battery pack 504 attachable to the handle 503. The electrical motor unit 510 is mounted inside the housing 501, and the cooling device 530 is also arranged within the housing 501. Thus, the heat sink 531 and the cooling fan 532 are here mounted within in the housing.

As is shown in FIG. 5, the energy transporting device 520 can be arranged in alignment with the shaft 502 of the power tool. Preferably, the cooling device is arranged inside the housing such that it is adjacent to, or in a ventilated connection with, one or more ventilation apertures/holes in the housing, which facilitates access to the ambient air surrounding the power tool 500.

Due to the fact that the heat pipe provides a very efficient cooling of the motor unit 510 no further cooling, such as air cooling is needed. It is to be noted that the fan 532 of the present invention is only used to indirectly cool the motor unit 510, i.e. via cooling of the cooling device 530. Enhanced cooling of the cooling device 530 accelerates cooling of the motor unit 510 via the heat pipe 520.

As a consequence, the motor unit 510 may be air tightly encapsulated so as to prevent dirt from enter inside the motor unit 510. In FIG. 5, the motor unit 510 is encapsulated in an encapsulation device 525, which is both a stator bracket and an air tight encapsulation device 525 making sure that dirt may not enter the motor unit 510. The motor unit 510 may however be encapsulated in other ways that provide an air tight protection around the motor unit 510, for example a plastic or rubber housing is arranged around the motor unit.

The cooling device 530 is arranged outside of the encapsulation device 525, wherein the heat pipe 520 passes through said encapsulation device 525 via an air sealed opening. The cooling and the fan are hence not encapsulated in an air tight manner. However, a removable housing part 526 may be arranged to cover the cooling device 530. The removable part 526 may also be arranged to cover the fan 532. The housing part 526 preferably comprises apertures for allowing a flow of cooling air though said housing part. The fact that it is removable provides access to the cooling device 530, and in applicable cases the fan, such that the cooling device may be cleaned so as to improve its cooling efficiency. Cleaning of the fan may also be necessary from time to time, but has less impact on the cooling efficiency.

According to another, not shown, embodiment of the invention, the cooling device 530 can at least partly be arranged externally on the housing and/or handle, wherein for example the cooling fins of the heat sink 531 are arranged on the exterior of the housing 501 and/or the handle. Hereby, the cooling fan 532 may be omitted because of the ample access of ambient cooling air for the cooling fins/heat sink 531. According to another embodiment of the invention, the cooling device 530 is at least partly arranged within the handle 503 of the tool 500.

As is clear for a skilled person, the power tool 500 can be arranged and designed in a large number of ways, and the location of the electrical motor unit 510 and/or the energy transporting device 520 and/or the cooling device 530 according to the present invention may differ for these power tools. Modification of the electrical motor unit 510, such as gearing, and/or of the energy transporting device 520, such as bends and curves of the energy transporting device 520, and/or the cooling device 530, such as shaping of the cooling fins 533 of the heat sink 531 or location for the fan 532, may be necessary for providing a proper tool function and enough cooling.

Further, a control unit 505 is arranged, e.g. to control the cooling of the motor unit, specifically by controlling the operation of the fan 532. Namely, in a preferred embodiment the fan 532 is arranged to provide a cooling air stream to the heat sink 531 independently of the operation of the motor unit. The fan may therefore be provided a specially allocated battery for providing energy to the when the tool is not in operation, and even when the tool battery is removed from the tool, or the otherwise provided energy is disabled, e.g. malfunction or removal of an electric cable. The specially allocated battery may be arranged to be charged by the ordinary energy supply, i.e. battery or cable.

A sensor connected to the control unit 505 may be arranged to monitor the temperature of the stator and the fan 532 may be arranged to provide a cooling air stream to the heat sink 531 based on said monitored temperature of the stator. For example the control unit 505 may control the fan to operate as long as the temperature of the motor exceeds a specific temperature or as long as the temperature difference between the hot and cold end of the heat pipe 520 is over a certain threshold ΔT. The control unit 505 may also be arranged to increase the effect of the fan 532 in dependence of the current temperature of the motor unit. Efficient air cooling of the heat sink 531 will accelerate the cooling of the cold end of the heat pipe and thereby make sure that more liquid is provided to cool the hot end of the heat pipe by vaporisation.

The fan may be controlled by the control unit 505 so as to provide cooling during a predetermined time interval, e.g. for a specific time after a concluded tightening operation.

According to an aspect of the present invention, a method for cooling an electrical motor unit of a power tool is presented. According to the method, and as described above, thermal energy is transported via a heat pipe 520 from inside of the electrical motor unit 510 to the cooling device 530, which is located outside the electrical motor unit 510. The thermal energy is transported by an energy transporting device 520, which utilizes transitions between the liquid and vapour phase of its working fluid. The thermal energy is hereby transported from the first end 521 to the second end 522 of the energy transporting device 520. According to an embodiment of the invention, the energy transporting device is a heat pipe. The first end 521 of the energy transporting device is arranged inside the electrical motor unit 510, where it is heated up. The second end 522 is arranged in thermal contact with the cooling device 530, in which the thermal energy is dissipated.

Hereby, a very efficient cooling method is achieved, since the heat from the electrical motor unit is lead away to a location where heat dissipation can be more easily performed than in the motor unit itself.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:
1. A hand-held power tool comprising:
a housing configured to be hand-held by an operator;
an electrical motor unit provided in the housing and comprising a stator and a rotor arranged concentrically outside the stator;
a cooling device provided in the housing and comprising a heat sink and a fan arranged to provide a cooling air stream to the heat sink, the cooling device being provided outside of the electrical motor unit;
a heat pipe extending from inside of the stator to outside of the stator, the heat pipe including a first end arranged at the inside of the stator and thermally connected to the stator, and a second end arranged at the outside of the stator and thermally connected to the cooling device, and the heat pipe comprising a phase changing fluid for transporting heat from the first end to the second end to be dissipated at the cooling device,
wherein a portion of the housing that covers the cooling device is a removable housing part that is removable to expose the cooling device, and the removable housing part comprises apertures for allowing a flow of cooling air though the removable housing part.
2. The hand-held power tool according to claim 1, wherein the removable housing part is provided at an end of the housing along an axial direction of the stator.
3. The hand-held power tool according to claim 1, wherein the fan is located radially above the heat sink in the housing of the hand-held power tool.
4. The hand-held power tool according to claim 1, further comprising a stator bracket which is connected to the housing and carries the stator,
wherein the stator bracket is positioned between the stator and the cooling device, and
wherein the heat pipe extends through the stator bracket.
5. The hand-held power tool according to claim 4, wherein the rotor is arranged on the stator bracket via a bearing.
6. The hand-held power tool according to claim 1, wherein the electrical motor unit is provided in an air-tight encapsulation which prevents air from entering the motor unit,
wherein the cooling device is provided outside of the air-tight encapsulation of the electrical motor unit, and
wherein the heat pipe extends from inside to outside of the air-tight encapsulation of the electrical motor unit via an air-sealed opening in the air-tight encapsulation.
7. The hand-held power tool according to claim 6, wherein the removable housing part is provided at an end of the housing along an axial direction of the rotor.

8. The hand-held power tool according to claim 6, further comprising a stator bracket which is connected to the housing and carries the stator,
   wherein the stator bracket is positioned between the stator and the cooling device, and
   wherein the heat pipe extends through the stator bracket.

9. The hand-held power tool according to claim 8, wherein the rotor is arranged on the stator bracket via a bearing.

10. The hand-held power tool according to claim 1, wherein stator windings are arranged inside the rotor.

11. The hand-held power tool according to claim 1, wherein the fan is arranged to provide the cooling air stream to the heat sink independently of an operation of the electrical motor unit.

12. The hand-held power tool according to claim 11, wherein a battery is specifically allocated to drive the fan.

13. The hand-held power tool according to claim 1, wherein the heat sink comprises at least one cooling fin arranged for dissipating thermal energy.

14. The hand-held power tool according to claim 1, wherein a sensor is arranged to monitor temperature of the motor unit, and the fan is configured to provide a cooling air stream to the heat sink based on the monitored temperature of the motor unit.

15. The hand-held power tool according to claim 1, wherein the first end of the heat pipe is integrated in the stator.

* * * * *